United States Patent [19]

Claassen

[11] Patent Number: 4,848,420

[45] Date of Patent: Jul. 18, 1989

[54] APPARATUS FOR LIQUEFYING A THERMOPLASTIC PLASTIC

[76] Inventor: Henning J. Claassen, Industriegebiet Hafen, 2120 Lüneburg, Fed. Rep. of Germany

[21] Appl. No.: 111,335

[22] Filed: Oct. 22, 1987

[30] Foreign Application Priority Data

Oct. 23, 1986 [DE] Fed. Rep. of Germany ....... 3636124

[51] Int. Cl.$^4$ ............................................. F27B 14/00
[52] U.S. Cl. ........................................ 141/82; 141/37; 141/67; 141/98; 141/329; 141/363; 222/146.2; 432/161; 126/343.5 A
[58] Field of Search ................ 126/343.5 A; 432/161; 222/400.7, 400.8, 146.1, 146.2; 141/37, 67, 367, 364

[56] References Cited

U.S. PATENT DOCUMENTS

| | | | |
|---|---|---|---|
| 2,641,676 | 6/1953 | Jeurling | 126/343.5 A |
| 2,995,159 | 8/1961 | Berggren | 141/82 |
| 3,459,335 | 8/1969 | Cohen et al. | 222/146.1 |
| 3,662,927 | 5/1972 | Cocks | 222/146.1 |
| 3,665,158 | 5/1972 | Froedge | 141/82 |
| 4,024,854 | 5/1977 | Park | 126/343.5 A |
| 4,505,669 | 3/1985 | Rogers | 126/343.5 A X |
| 4,733,650 | 3/1988 | Triggs | 126/343.5 A |

Primary Examiner—Ernest G. Cusick
Attorney, Agent, or Firm—Armstrong, Nikaido Marmelstein Kubovcik & Murray

[57] ABSTRACT

An apparatus for liquefying a polyurethane based thermoplastic adhesive which includes a heatable sealed supply container having an upper portion for receiving a downwardly open transport container for the adhesive and a lower portion serving as a buffer volume. A base portion is arranged below the supply container and includes a collecting trough leading to an outlet passage. A cover is provided at the upper end of the supply container and a conduit supplies an inert gas to the interior of the supply container. The conduit also opens into the interior of the transport container. A mandrel having a tip is provided at the inner side of the cover and the tip penetrates the transport container when the cover is closed. The inert gas is provided through an outlet opening located in the side wall of the tip of the mandrel. The gas supply through the conduit is periodically interrupted by a magnetic valve operated by a timer which only opens the valve for short periods, which provides an appreciable gas saving.

6 Claims, 2 Drawing Sheets

4,848,420

APPARATUS FOR LIQUEFYING A THERMOPLASTIC PLASTIC

BACKGROUND OF THE INVENTION

1. Field of the Invention

The invention relates to an apparatus for liquefying a thermoplastic plastic, in particular an adhesive on the basis of polyurethane.

2. Description of the Prior Art

In such a liquefying apparatus as is known from DE-GM No. 86 00 021 (U.S. Pat. No. 4,724,983) the heatable sealed supply container comprises an upper portion for receiving a downwardly open transport container for the thermoplastic plastic and a lower portion serving as buffer volume. A heating means heats the thermoplastic plastic disposed in the transport container so that said plastic becomes liquid and drops down into a base portion which is disposed beneath the supply container and the transport container and receives a collecting trough for the liquefied thermoplastic plastic. At the upper end of the supply container a pivotally constructed cover is disposed which is provided at its inside with a mandrel; when the cover is closed the tip of the mandrel penetrates into the upwardly directed face of the transport container.

An inert gas usually serving as protective gas is supplied to the interior of the supply container via a conduit.

However, in tests with such a liquefying apparatus problems have been encountered related mainly to the supply of the gas, for example nitrogen, carbon dioxide or also compressed air in the case of less sensitive plastics. Firstly, there is the danger that the gas collects only in the base portion of the liquefying apparatus and in particular does not reach the thermoplastic plastic in the transport container so that in the latter undesirable reactions can occur. In spite of this screening action being not satisfactory, the gas consumption is very high because gas has to be continuously supplied to the interior of the supply container.

SUMMARY OF THE INVENTION

The invention is thus based on the problem of providing an apparatus for liquefying a thermoplastic, in particular an adhesive on the basis of polyurethane, of the type indicated in which the aforementioned disadvantages do not occur. In particular, a liquefying apparatus is to be proposed which makes possible a still better protection from undesirable reactions for highly sensitive highly viscous compositions readily reacting in the presence of air.

The invention therefore proposes in an apparatus for liquefying a thermoplastic plastic, in particular an adhesive on the basis of polyurethane, comprising a heatable sealed supply container which comprises an upper portion for receiving a downwardly open transport container for the thermoplastic plastic and a lower portion serving as buffer volume, a heating means for heating the thermoplastic plastic disposed in the transport container, a base portion arranged beneath the supply container and receiving a collecting trough for the liquefied thermoplastic plastic, a cover at the upper end of the supply container and a conduit for the supply of an inert gas to the interior of the supply container, the improvement that the conduit comprises an opening leading to the transport container.

Expedient embodiments are defined by the features of the subsidiary claims.

The advantages achieved with the invention are based on the fact that the gas, possibly also compressed air, is conducted specifically directed into the interior of the downwardly open transport container so that firstly a complete enclosure of the thermoplastic plastic in the transport container by the gas results and secondly the flowing of the liquefied thermoplastic plastic out of the transport container is supported by the gas pressure.

A particularly suitable "conduit" for supplying the gas has been found to be the mandrel which is disposed at the inner side of the pivotal cover and the tip of which penetrates into the upwardly directed face of the transport container when the cover is closed. If the tip of the mandrel is provided with an outlet opening for the gas and the mandrel is connected to the gas conduit the gas pressure acts on the upper side of the thermoplastic plastic in the transport container, i.e. when the thermoplastic plastic flows out downwardly it protects said upper side and also supports the downward movement of the thermoplastic plastic.

To avoid clogging of the outlet opening for the gas by contact with the liquefied thermoplastic plastic the outlet opening is preferably formed at the side of the mandrel and provided with an additional bend.

To reduce the gas consumption the guard gas, or the possibly used compressed air supplied, is introduced only periodically, i.e. a valve, in particular a magnetic valve, provided in the supply conduit for the gas is controlled for example via a programmable time switch so that the magnetic valve opens after every 20 seconds for one second; the amount of gas then emerging, which is very small compared with that in continuous operation, suffices to protect sensitive thermoplastic plastics; at the same time, compared with the hitherto usual continuous operation a saving of about 90% gas is obtained. This saving cannot be achieved with conventional means, i.e. using sensitive adjusting elements for the gas supply, for example extremely fine regulation of the gas flow.

A further advantage of this "clocked" gas supply is that the system is subjected to the protective gas in surges and this has a favourable effect on the liquefaction.

Conveniently, provided in the flow direction of the gas between the magnetic valve is a pressure and/or flow regulator with appropriate meter so that extremely low rates of flow can also be set.

BRIEF DESCRIPTION OF THE DRAWINGS

The invention will be described hereinafter in detail with the aid of examples of embodiment with reference to the enclosed schematic drawings, wherein.

DESCRIPTION OF THE PREFERRED EMBODIMENT

Figure 1:
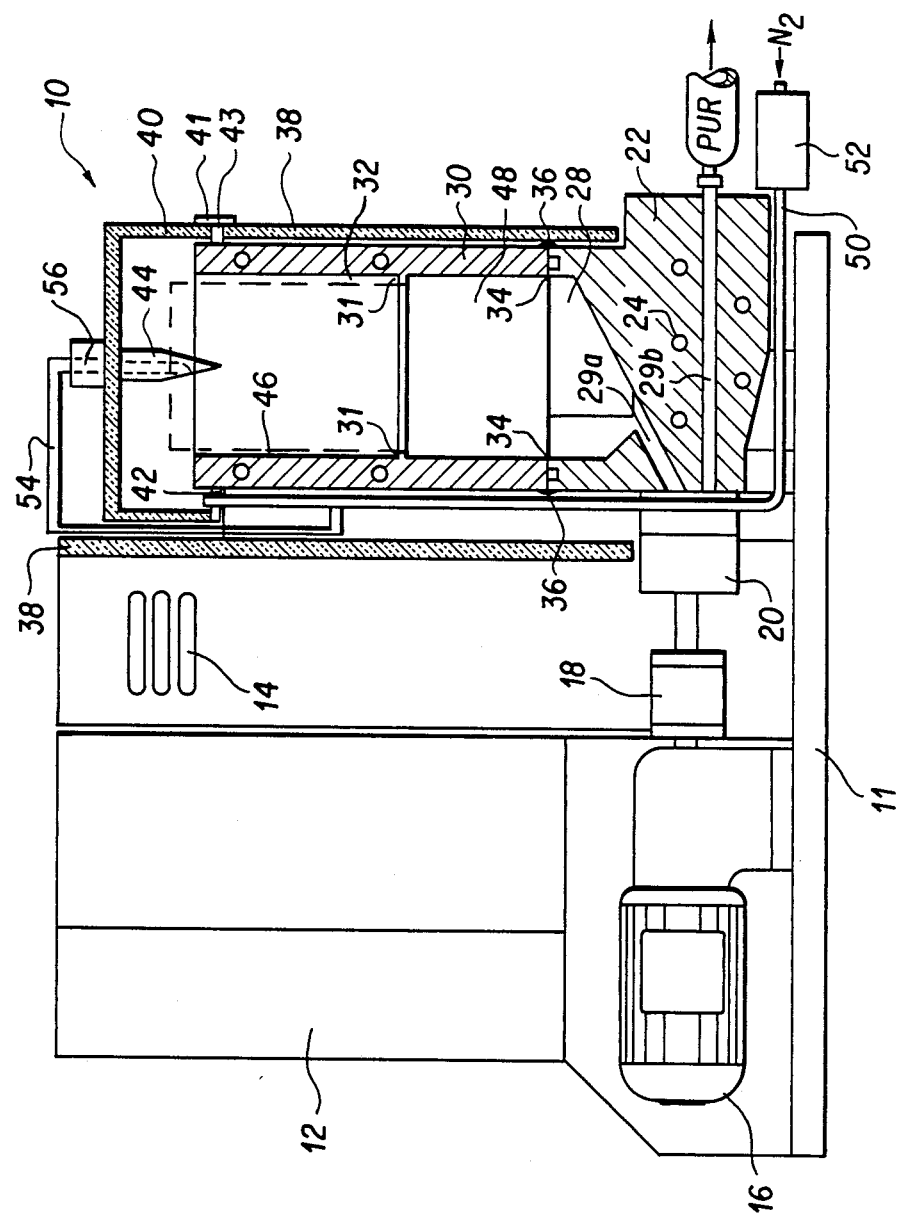
FIG. 1 is a vertical section through an apparatus for liquefying an adhesive on the basis of polyurethane.

The liquefying apparatus generally denoted by the reference numeral 10 comprises a base plate 11 which carries an electric motor 16, a switch cabinet 12 which accommodates the electrical switch elements for controlling the temperature at the various heating elements and is provided with ventilating slots 14, and on the right side of the illustration in the Figure the actual liquefying part. The electric motor 16 drives via a coupling, in particular a magnetic coupling, or a gearing, generally a reduction gearing, which are designated by the reference numeral 18, a pump 20, generally a gear-type pump, for conveying the heating and thus liquefied polyurethane adhesive.

The actual liquefying part is disposed in a heat-protection hood 38 which also screens the sensitive electronic components of the switching cabins 12 and is sealed at its upper end by a pivotally mounted cover 40. For sealing the gap between the cover 40 and the lower region of the liquefying part seals 43 and 42 are provided. Moreover, a schematically indicated latch means 41 is provided which holds the cover 40 in its operating position shown in the Figure.

The actual liquefying part comprises a block-shaped substructure 22 with heating bores 24 in which for example electrical resistance heaters are disposed which are insulated by means of chamotte tubes.

At its upper end the block 22 comprises a recess 28 formed as collecting trough which is connected via a passage 29a to the pump 20. From the pump 20 a further position 29b of the conveying passage leads to the outlet for the liquefied adhesive.

By brackets 36 the actual supply container 30 is detachably secured to the block 22 and the walls of said container 30 are likewise provided with heating bores 32 in which for example electrical resistance heating elements insulated by means of chamotte tubes are disposed.

Between the upper edge of the walls of the block 22 in the region of the recess 28 and the lower edge of the walls of the supply container 30 seals 34 are provided, in particular insulations on the basis of mineral fibers, expediently asbestos.

As is apparent from the Figure the two upper seals 43 and 42 bear on the outer wall of the upwardly open supply container 30. The supply container 30 comprises two parts, that is a lower buffer volume 48 and an upper part which is separated from the lower part 48 by a narrow encircling web 31 projecting inwardly from the inner wall thereof. Resting on this web is the lower edge of a downwardly open transport container 46 for the adhesive which is indicated in the Figure in dashed lines.

The inner edge of the cover 40 is provided with a downwardly projecting pointed mandrel 44 whose tip penetrates into the upwardly directed bottom face of the transport container 46.

A conduit 50 for an inert gas, in particular nitrogen or carbon dioxide, possibly also however compressed air, is connected to a flow control 52 indicated only schematically in FIG. 1 and extends through beneath the block 22 and then laterally past the supply container 30 upwardly and opens into the cavity which is formed between the upper end of the supply container 30 and the cover 40. From the conduit 50 an extension 54 branches off and is connected to the mandrel 44. Extending through the mandrel 44 is the passage 56 shown in FIG. 1, said passage emerging laterally at the tip of the mandrel 44.

Figure 2:
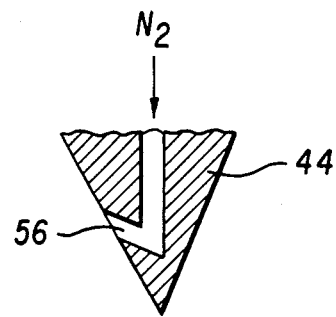
FIG. 2 shows to an enlarged scale a view of the mandrel with the outlet opening for the protective gas and FIG. 3 is a detail view of the gas supply.

As apparent in FIG. 2 the passage 56 first extends in the axial direction of the mandrel 44 and then bends at an angle of more than 90° to the side, i.e. even somewhat against the flow direction rearwardly so that the gas emerging from the passage 56 in the mandrel 44 blows upwardly against the bottom of the transport container 46.

Figure 3:
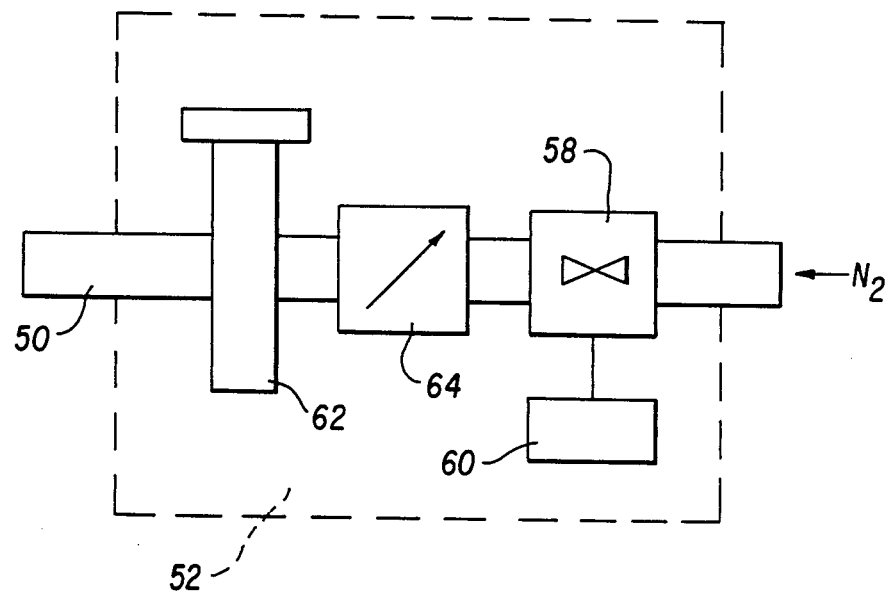

The flow control 52 (FIG. 3) comprises a magnetic valve 58 which is controlled via a time switch 60. Said time switch 60 closes the magnetic valve 58 for example for 20 seconds, i.e. for this period of time interrupts the gas supply, and then opens said magnetic valve 58 for one second to permit the gas flow. Provided behind the magnetic valve 58, seen in the flow direction, is a fine adjustment valve 62 with extremely fine manometer 64 so that even extremely small rates of flow and/or pressures can be adjusted.

When the operation is started the cover 40 is opened and a transport container 46 for the adhesive on the basis of polyurethane, which is open at one side, is introduced into the supply container 30 with the opening downwards so that the lower edge of the transport container 46 comes to rest on the encircling web 31. The adhesive on the basis of polyurethane is so viscous that it cannot flow out of the downwardly opened transport container 46.

The cover 40 is then closed so that the tip of the mandrel 44 penetrates from above into the transport container 46. At the same time the gap between the cover 40 on the one hand and the heat-protection hood 38 or the supply container 30 on the other hand is sealed by means of the seals 43, 42. Nitrogen for example is then supplied via the flow control 52 and the conduit 50 so that firstly the air is expelled from the supply container 30 and the collecting trough 28 and simultaneously nitrogen acts via the mandrel 44 and the passage 56 from above on the adhesive in the transport container 46, i.e. generates an additional downwardly directed force component. Thus, the adhesive can no longer come into direct contact with the ambient air.

The two independently controllable heating devices for the block 22 on the one hand and the supply container 30 on the other are now switched on. As a result the adhesive in the transport container 46 liquefies and then flows out of said container 46 downwardly into the buffer volume 48. Said buffer volume 48 is so dimensioned that it suffices to accommodate an amount of adhesive corresponding to the largest transport container volume to be handled The liquefied adhesive then passes from the buffer volume 48 over the recess 28 serving as collecting trough and the passage 29a to the pump 20 which supplies the liquefied adhesive via the passage 29b to the outlet.

Further gas is supplied via the passage 56 in the mandrel 44 to shield the surface of the adhesive until complete discharge thereof from the transport container 46. The supply of the nitrogen is periodic by means of the flow control 52, that is with a cycle which can be set by means of the time switch 60. It is possible to take account here for example of the properties of the adhesive used on the basis of polyurethane and also of the volume and/or pressure of the nitrogen supplied.

When the transport container 46 has been completely emptied the cover 40 is opened again, the empty transport container 46 is removed and a new full transport container 46 inserted. The processing can be carried out simultaneously because liquefied adhesive is still in the buffer volume 48; at the top towards the ambient air this heated and thus particularly reactive adhesive is shielded by the nitrogen hood so that a continuous operation is possible without any impairment of the properties of the heated adhesive in the buffer volume 48.

Since the heatable supply container 30 is secured detachably to the block 22 with the collecting trough 28 it can easily adapt itself to different processing volumes and thus transport container volumes by for example replacing the hollow cylindrical or cuboid supply container 30 by another embodiment of corresponding volume.

The temperatures in the block 22 on the one hand and the supply container 30 on the other are kept to a settable desired constant value by means of the usual thermostat devices and corresponding temperature sensors, which are not shown. The corresponding electronic components are disposed in the switching cabinet 12.

I claim:

1. An apparatus for liquefying a polyurethane based thermoplastic adhesive in a transport container comprising:
   (a) a heatable sealed supply container having an upper portion for receiving a downwardly open polyurethane based thermoplastic adhesive transport container and a lower portion serving as a buffer volume,
   (b) a heating means for heating the thermoplastic adhesive disposed in the transport container,
   (c) a base portion arranged beneath the supply container and having a collecting trough for receiving the liquefied thermoplastic adhesive,
   (d) a cover at the upper end of the supply container,
   (e) a source of an inert gas which is non-reactive with the polyurethane based thermoplastic adhesive in the transport container, and
   (f) a conduit supplying inert gas from the source to the interior of the supply container and having an opening leading to the interior of the transport container, whereby the thermoplastic adhesive is heated and liquefied in the non-reactive, inert gas.

2. An apparatus according to claim 1, wherein said downwardly open transport container has a bottom adjacent said cover and the opening of the conduit is disposed near the bottom of the transport container.

3. An apparatus according to claim 1 comprising a pivotally mounted cover having a mandrel on the inner side thereof, said mandrel having a tip adapted to penetrate into the transport container as the cover, is closed, and the conduit extends through the mandrel and the opening leading to the interior of the transport container is disposed in the tip of the mandrel.

4. An apparatus according to claim 3, wherein the opening is provided in a side wall of the tip of the mandrel and the conduit through the mandrel comprises a passage which extends art-way through the mandrel in an axial direction of said mandrel and which is connected by a bend to he opening present in the side wall of the tip of the mandrel.

5. An apparatus according to claim 4, wherein the opening of the passage is directed toward the upwardly directed face of the transport container.

6. An apparatus according to claim 1, wherein the non-reactive, inert gas is selected from the group consisting of nitrogen, carbon dioxide and compressed air.

* * * * *